(12) United States Patent
Fay

(10) Patent No.: US 7,685,222 B2
(45) Date of Patent: Mar. 23, 2010

(54) POWER OF TWO MULTIPLICATION ENGINE

(75) Inventor: Luke Fay, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1235 days.

(21) Appl. No.: 11/217,928

(22) Filed: Aug. 31, 2005

(65) Prior Publication Data

US 2006/0095496 A1    May 4, 2006

Related U.S. Application Data

(60) Provisional application No. 60/624,461, filed on Nov. 1, 2004.

(51) Int. Cl.
   *G06F 7/53* (2006.01)
(52) U.S. Cl. .................................................. 708/625
(58) Field of Classification Search .................. None
   See application file for complete search history.

(56) References Cited

U.S. PATENT DOCUMENTS

| | | | |
|---|---|---|---|
| 4,475,167 A * | 10/1984 | Chen | 708/625 |
| 4,573,136 A | 2/1986 | Rossiter | |
| 5,117,385 A | 5/1992 | Gee | |
| 5,243,552 A * | 9/1993 | Asakura | 708/625 |
| 5,402,369 A * | 3/1995 | Main | 708/625 |
| 6,943,579 B1 * | 9/2005 | Hazanchuk et al. | 326/39 |
| 7,046,723 B2 | 5/2006 | Schier et al. | |
| 7,356,554 B1 * | 4/2008 | Hazanchuk et al. | 708/625 |

* cited by examiner

*Primary Examiner*—David H Malzahn
(74) *Attorney, Agent, or Firm*—John P. O'Banion

(57) ABSTRACT

A multiplication engine is described in which a decision threshold engine utilizes a Y-adder powers of two shift table to iteratively generate shift-add combinations. The shift-add combinations are output in a sequence with decreasing levels of contribution wherein the accuracy of the associated multiplication increases up to any desired level of accuracy to meet the requirements of the application. The multiplication engine can be used for generating the combinations either statically or dynamically. One embodiment describes a Y-adder hardware slider table engine in which the shift table is implemented with shifters and adders that can be set for active state or pass through state, and selectively summed to generate a product result directly from the table without the need to combine shift and add hardware.

20 Claims, 9 Drawing Sheets

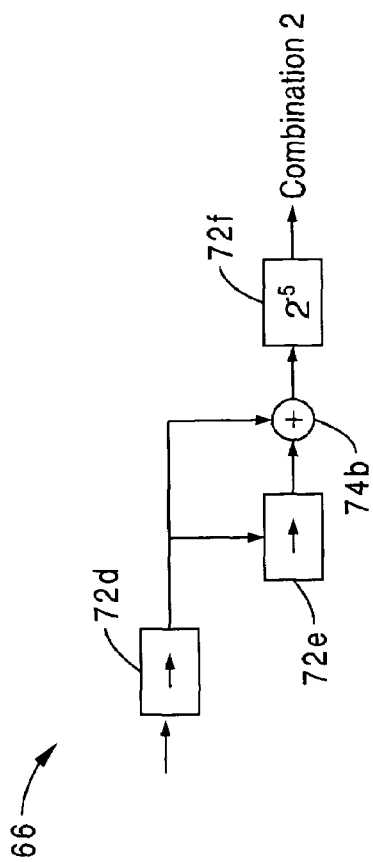
FIG. 6A
FIG. 6B
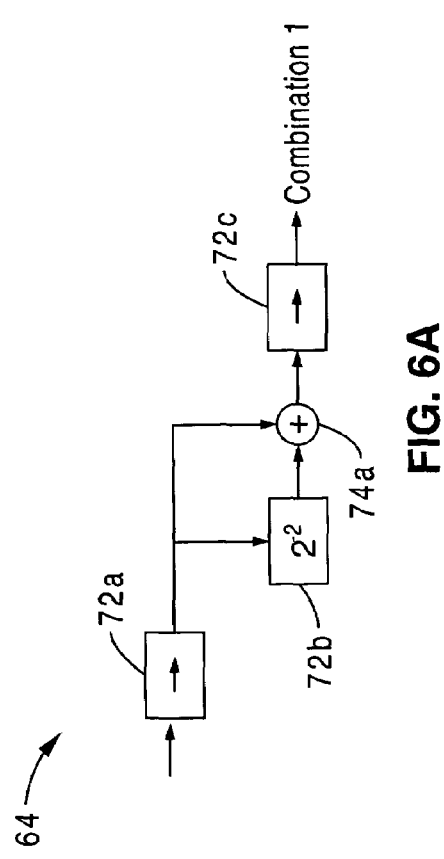
FIG. 6C
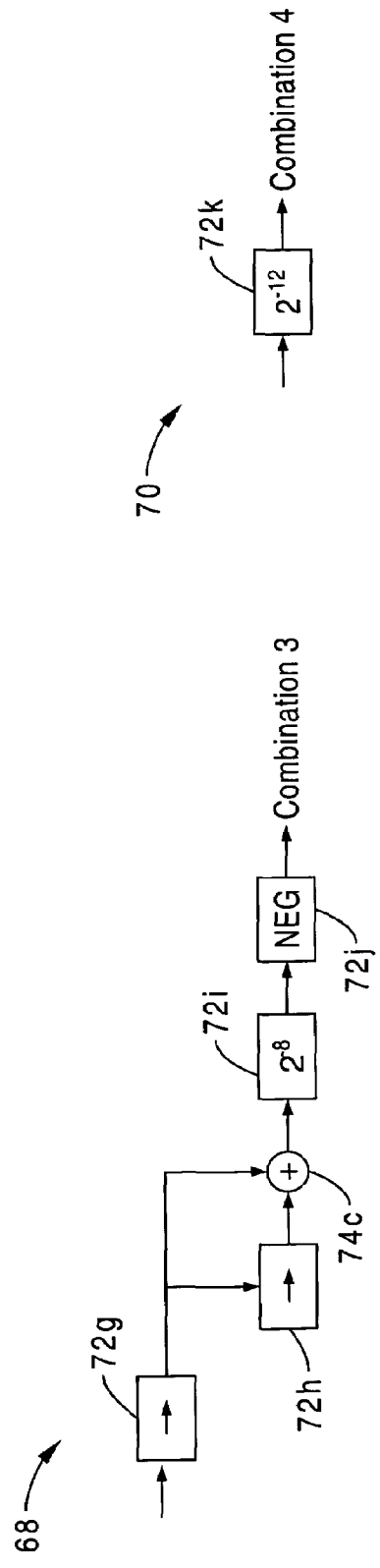
FIG. 6D

POWER OF TWO MULTIPLICATION ENGINE

CROSS-REFERENCE TO RELATED APPLICATIONS

This application claims priority from U.S. provisional application Ser. No. 60/624,461, filed on Nov. 1, 2004, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to methods of performing multiplications in electronic systems, and more particularly to a method of determining shift-add combinations using table lookup.

2. Description of Related Art

Numerous applications rely on performing digital multiplication between a multiplicand and a multiplier to produce a product. By way of example, multiplication with some coefficient numbers is necessary when determining compensation for channel conditions or to process incoming data of any kind.

Implementation of multipliers typically requires a substantial amount of hardware, especially if many bits of accuracy are required. For many applications the multiplier comprises a value between 0 and 1 (represented in binary to any desired bit width), in other applications the multiplier can be scaled down into that range by pre-processing with right shifts.

Typically, in attempting to reduce multiplication overhead many have utilized techniques which operate to limit the number of one bits within each coefficient number in preparation for a power of two multiplication. This power of two can then be known as Canonic Sign Digit. The method determines a coefficient which results in the smallest combination of binary "1" bits that can best represent that number. Once this combination is found, the multiplier is static in hardware and does not change. For signal processing applications that encompass changing coefficients, the typical implementation utilizes a dedicated multiplier, which is hardware intensive and as a result costly.

Accordingly, a need exists for a method of performing rapid and overhead digital multiplications using a form of power of two multiplications driven from tables and a quick decision tree for narrowing coefficients and generating the combinations based on the table.

BRIEF SUMMARY OF THE INVENTION

A multiplication engine and method are taught for executing a rapid and low overhead power of two's multiplication in response to right shifts and adds looked up in a table which has a configuration according to the invention which will be referred to herein as a "Y-adder power of two shift table", though also referred to in short as a "shift table" or just "table". The teachings are amenable to embodiment in hardware, firmware (software), or a combination of hardware and firmware, and may be utilized in performing either static or dynamic multiplications. The technique is particularly well suited for use in dynamic hardware multiplication in which coefficients are iteratively determined and shift-add combinations generated according to the table which are then combined to form the hardware multiplication, or may be used separately in firmware. Multiplicands received as input to the multiplier are then processed at high speed to generate a result with the desired level of accuracy.

The numerous applications which perform static or dynamic multiplication meet these requirements utilizing hardware and/or firmware-software solutions. For example, once the shift-add paths are determined, the multiplications can be performed within electronic control circuit hardware. The control circuit can be implemented with field-programmable gate arrays and other programmable logic, custom circuitry including application specific integrated circuits (ASIC's) and so forth. Multiplications can also be performed in response to execution of a program within a processing element, such as within microprocessors, microcontrollers, digital signal processors, and the like. A combination approach using a mixture of hardware and firmware-software can also be utilized as an intermediate approach.

The approach can be used for performing static multiplication in which a single multiplier value is used and the shift-add path in the shift table is therefore fixed. The technique provides additional benefits when considering dynamic multiplication in which the multiplier value is a variable. In this case the coefficients determined by the threshold detection engine, and thus the path in the shift table from which the shift-add combination for the multiplication is generated, will vary as the multiplier value dynamically changes.

Embodiments are also described in which the table is implemented in hardware wherein shifters and adders need not be reconnected into different configurations for each set of shift-add paths. In this embodiment the table becomes the hardware multiplication engine which performs multiplication in response to a controller setting each modified shift/add block for either a pass-through (NOP) or the action (shift/add) in response to the multiplier value.

The teachings of the present invention can be configured for any compatible width multiplier, multiplicand and product, for example 32 bits, 34 bits, 48 bits, 64 bits and so forth. It should be appreciated in view of these teachings that the method and apparatus of the invention can be implemented in any desired combination of hardware, firmware, and software without departing from the teachings herein. The apparatus may also be implemented in control sequences, for example in systems that require certain paths to be followed, wherein a processor develops new paths based on results to periodically, or continuously improve performance.

The invention is amenable to being embodied in a number of ways, including but not limited to the following descriptions which utilize language similar to that found in the claims.

One embodiment of the invention can be generally described as a method of executing a multiplication in an electronic circuit, comprising:

(a) creating a Y-adder power of two shift table having a multiplicand input of a desired bit width (operand word) coupled to at least one shifter column (shown as vertical in the figures) and at least one column of adders, with rows of right shifters extending from the adder columns;

wherein coefficients are equated to the output contribution of each of the shifter or adder in proportion to the multiplicand input;

(b) receiving a multiplier value of a desired bit width to which the multiplicand input values are to be multiplied by the electronic circuit;

(c) locating a coefficient associated with a shift-add path in the table to successively approach the received multiplier value;

(d) storing the shift and add path for the coefficient;

(e) repeating execution of steps (c) and (d) until a desired level of accuracy has been obtained in approaching the received multiplier value; and (f) combining the stored shift and add paths to form a multiplication engine in which the multiplicand value is multiplied by the multiplier value to generate an output product.

In one embodiment, the multiplication engine is configured by combining into hardware the stored shift and add paths, an example of which is depicted in FIG. 3.

In another embodiment the multiplication engine is configured by executing the stored shift and add paths within a microprocessor, for example by encoding a sequence of shift and add instructions, without the need of flow control logic for selecting the shifts and adds in response to the received multiplier value.

In another embodiment the Y-adder power of two shift table is implemented in hardware as a Y-adder hardware slide shifter engine, and further comprises:

a plurality of hardware slide shifters and hardware slide adders, forming at least a portion of the interconnected elements within the Y-adder shift table, that can be set into either an active state in which the shift or add is performed, or a passive state in which the input is passed to the output; (it is preferred that all shifters and adders in the hardware have the selectable pass-through feature known as "slide");

a column of slide adders coupled to the end of the slide shifter rows for summing the contributions from each row of slide shifters and the sum from preceding rows into a resultant product sum;

a controller for outputting state control signals to set the state of the slide shifters and slide adders (i.e., bits for setting pass-through modes on slide shifters prior to the first column of adders, the one or more columns of adders, and the rows of slide shifter extending from the column of adders) in response to the combination of the located coefficients; and wherein the multiplication engine is configured for performing a single pass multiplications with different multipliers without reconnecting shift and add paths.

It should be recognized that this hardware configuration provides a very rapid means of generating dynamic multiplication. After, or during locating coefficients, the associated paths are selected in the Y-adder hardware slide shifter engine and multiplied against incoming multiplicands to produce products.

It should be noted that the shift-add paths being stored, can also be output as they are located to provide a rough output which converges to a more accurate product as additional shift-add paths are located. The rough output can allow other circuit elements to begin to operate using the rough data. This aspect generally applies to all embodiments of the invention when the coefficients are made available as they are located.

The Y-adder power of two shift table according to one embodiment can be described as comprising or representing an input coupled to at least one column of series interconnected shifters preceding at least one column of Y-adders for combining an input from the shifter row with a contribution from the input.

Establishing the threshold for locating coefficients can be performed by a process of maintaining an error value as located coefficients are subtracted from the received multiplier value until the error is sufficiently close to the desired accuracy. Alternatively, establishing the threshold for locating coefficients can be performed by summing successively located coefficients until the sum is sufficiently close to the received multiplier value.

The coefficient locating process can select coefficients of a desired sign or be performed in response to the absolute values of the coefficients. In one embodiment the sign on each input of the adder can be selected by control bits (e.g., A=B+C; A=B−C; A=C−B; A=B (pass-through)).

In one embodiment the method divides the incoming value by a constant, wherein a constant contribution fraction from the input is added to the first shifted value within the Y-adder power of two shift table.

The method may be carried out using electronic hardware or firmware, or combinations thereof. In one embodiment the electronic circuit comprises a circuit having a processor which executes instructions for performing the steps of the multiplication engine.

One embodiment of the invention is used for designing a hardware circuit for performing static multiplication. In this case executing of the method comprises executing application programming which is configured for defining the multiplication in terms of shifts and adds which can be designed within, or programmed into, the hardware circuit.

In one mode of the invention the mechanism for locating coefficients is performed in response to a value table or value list which is created based on an ordering of coefficients of paths from the Y-adder power of two shift table. By way of example, the value table or value list contains a table or list of records, wherein each record contains a field with a coefficient and a field with a shift-add path to the coefficient; and wherein the value table or the value list is configured with the coefficient fields organized in numerical order.

In one embodiment, the task of locating successive coefficients is performed within a threshold engine executed in firmware or software, although it could similarly be executed by a combination of sequential and combinational logic circuitry.

In one embodiment a method of executing multiplications in an electronic shift-add circuit is described which allows the multiplier value to be setup rapidly and built without the need of configuring interconnections between shifters and adders according to the shift-add paths corresponding to the coefficients. The method comprising: (a) creating a Y-adder hardware slide shift engine having a multiplicand input of a desired bit width coupled to at least one shifter column and at least one column of adders, and rows of right shifters extending from the first adder column out to a terminating column of adders;

wherein the shifters and adders comprise hardware slide shifters and hardware slide adders that can be set into either an active state in which the shift or add is performed, or a passive state in which the input of a shifter, or one of the inputs of an adder, are passed to the output without shifting or adding; wherein coefficients are equated to the output contribution of each the shifter or adder in proportion to the multiplicand input;

(b) receiving a multiplier value of a desired bit width to which the multiplicand input values are to be multiplied by the Y-adder hardware slide shift engine;

(c) locating successive coefficients of diminishing contribution to the received multiplier value to successively approach a desired accuracy;

(d) outputting state control signals to the Y-adder hardware slide shift engine in response to the combination of shift-add paths corresponding to the located coefficients;

(e) wherein the multiplicand value is multiplied by the multiplier value within the Y-adder hardware slide shift engine and summed at the end of each shifter row to generate an output product in a single pass; and (f) wherein interconnections between shifter and adders need not be configured for different received multiplier values.

In one embodiment a multiplication engine is described which is configured for executing a sequence of multiplications between a multiplicand and multiplier within an electronic circuit, comprising:

(a) a Y-adder power of two shift table having a multiplicand input of a desired bit width coupled to at least one shifter column and at least one column of adders and rows of right shifters extending from the shifter and adder columns;

wherein coefficients of the Y-adder power of two table are equated to the output contribution of each the shifter or adder in proportion to the multiplicand input;

(b) a threshold decision engine executing on a processor and configured for receiving a multiplier value of a desired bit width to which the multiplicand input values are to be multiplied by the electronic circuit;

(c) programming configured for execution on the processor for, (i) locating a coefficient associated with a shift-add path in the table to successively approach the received multiplier value, (ii) storing the shift and add path for the coefficient, (iii) repeating the locating and storing execution steps until a desired level of accuracy has been obtained in approaching the received multiplier value; and (g) a control circuit configured for combining the stored shift and add paths to form a multiplication engine in which the multiplicand value is multiplied by the multiplier value to generate an output product.

The control circuit according to one embodiment can comprise programming executing on the processor for generating shift-add multiplication engine circuits in static hardware or programmable hardware.

The control circuit can also be implemented to provide multiplications without reconnecting shifts and adds. For example the control circuit comprises:

(a) a plurality of slide shifters and slide adders incorporated within the Y-adder power of two shift table forming a Y-adder hardware slide shift engine;

(b) a plurality of slide adders coupled in a column terminating each slide shifter row;

(c) a state generation circuit which outputs bits for selecting the active or pass-through state of the slide shifters and the slide adders in response to the combination of shift-add paths; and wherein multiplicands received by the multiplication engine pass through the Y-adder hardware slide shift engine and are multiplied against the multiplier value without changing the interconnections between shifters and adders in response to configuring the multiplier for different multiplier values.

In the above embodiment the slide shifters and the slide adders are configured in a first state for performing their respective shift or add operation, and in a second state for passing-through the input value received to the output; and wherein the slide adders are configured in a pass-though state to ignore one input and to pass-through the value received on the other input. Embodiments can be implemented with additional slide shifter columns incorporated preceding the first slide adder column within the Y-adder hardware slide shift engine.

Embodiments of the present invention can provide a number of beneficial aspects which can be implemented either separately or in any desired combination without departing from the present teachings.

An aspect of the invention is a multiplication engine which provides results of any desired accuracy with low overhead.

Another aspect of the invention is to provide a multiplication engine which can be configured for multiplying values for a multiplicand and multiplier which are of any desired bit width.

Another aspect of the invention is to provide a table-based multiplication engine in which the closest paths in the table to a set of constituent coefficients for the multiplication are readily located.

Another aspect of the invention is to provide a table-based multiplication engine in which the constituent coefficients are located with decreasing levels of contribution, wherein output can be used at any or all stages of multiplication.

Another aspect of the invention is a multiplication engine which utilizes a power of two table having one or more columns of adders and referred to herein as a Y-adder power of two shift table.

Another aspect of the invention is a multiplication engine which can be implemented for performing static and/or dynamic multiplication.

Another aspect of the invention is a multiplication engine which can be implemented in hardware and/or firmware (software).

Another aspect of the invention is a multiplication engine which can be efficiently implemented with a minimum of hardware.

Another aspect of the invention is a multiplication engine which can be efficiently implemented with a minimum of storage and execution overhead.

Another aspect of the invention is to provide a method of implementing a Y-adder power of two shift table for use in multiplication.

Another aspect of the invention is the inclusion of a threshold engine used with the Y-adder power of two shift table in order to multiply the desired number.

A still further aspect of the invention is a multiplication engine and method which can be implemented for determining shift-add combinations on the fly for dynamic multiplication, or performed using a computer aided design application program for designing static multiplication stages.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 6A-6D are schematics of combinations corresponding to shift-add paths taken from the table of FIG. 1 in response to locating four coefficients whose sum is sufficiently close to the received multiplier value of ⅓.

DETAILED DESCRIPTION OF THE INVENTION

Figure 1:
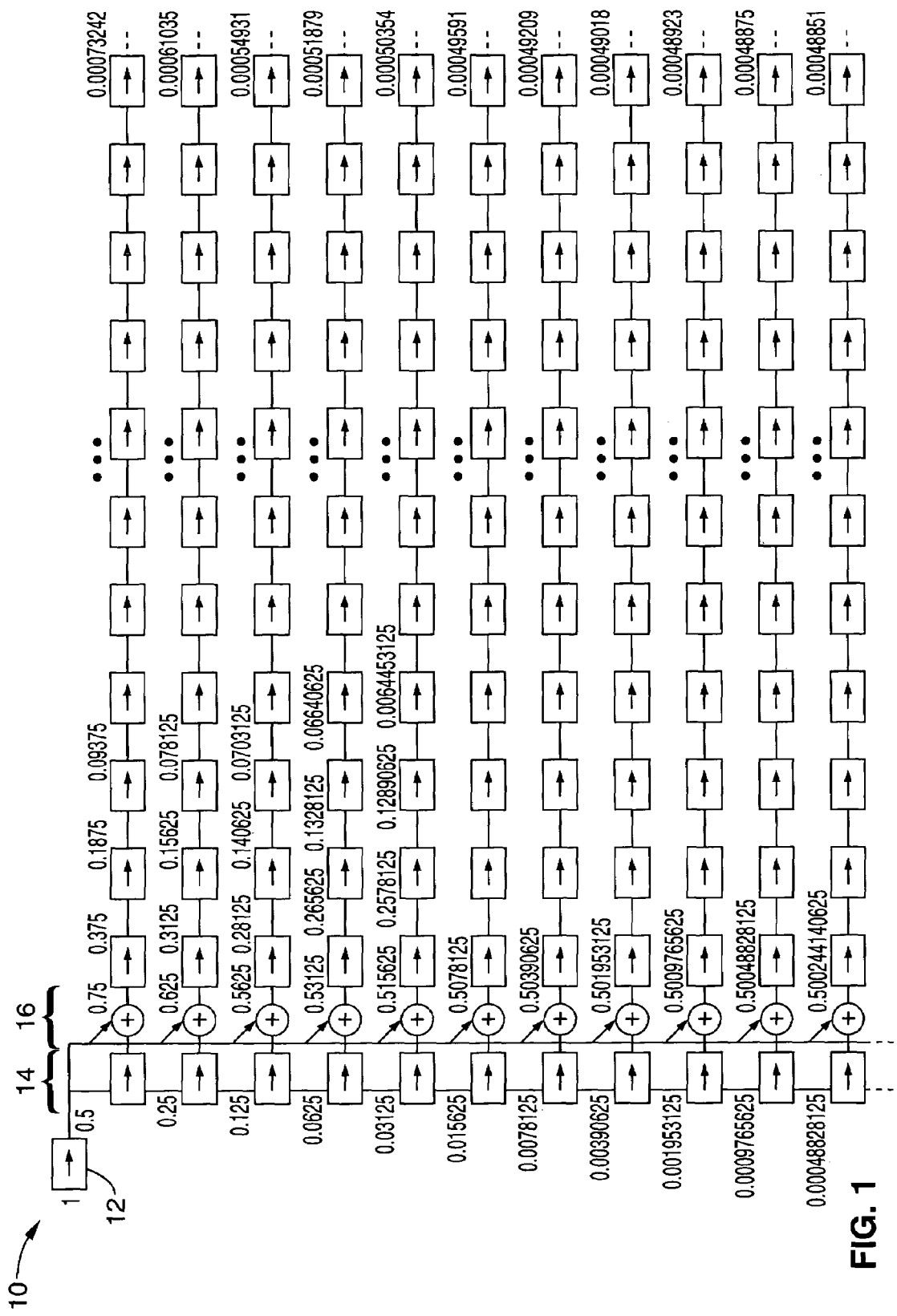
FIG. 1 is a table containing Y-adder power of two multiplication shift add paths and corresponding coefficients according to an aspect of the present invention.

Referring more specifically to the drawings, for illustrative purposes the present invention is embodied in the apparatus generally shown in FIG. 1 through FIG. 8. It will be appreciated that the apparatus may vary as to configuration and as to details of the parts, and that the method may vary as to the specific steps and sequence, without departing from the basic concepts as disclosed herein.

A multiplication engine is described which simplifies power of two multiplication (shifts) by utilizing a Y-adder power of two shift table and threshold decision engine to quickly determine a set of shift paths through the table that provide an accurate estimation of the desired multiplier as applied to a multiplicand. In static multiplication, the path to a coefficient or coefficients, is fixed and can be determined such as by computer aided engineering programming or other pre-design processes which utilize the teachings herein to determine shift-add combinations during the circuit design according to the invention. One example of static multiplication processing is performed within filtering applications.

However, in dynamic multiplication in which the multiplier value changes and thus so do the sets of coefficients, a decision engine can be used to determine the set of coefficients based on the table and thereby the closest shift-add paths which are combined to create the desired multiplication. Processing speed within the decision engine must be sufficiently fast to accommodate the variable nature of the multiplier and keep up with generating the shift-add combinations to the requirements of the given application.

Aspects of the present invention utilize processors (e.g., microprocessors, microcontrollers, digital signal processing chips, processor blocks within an ASIC, and so forth) which execute in response to commands contained in memory. Herein this programming is referred to generally as firmware. The term "firmware" generally connotes programming that is contained in the memory associated with an embedded processor, and not programming that is loaded from a media, such as from a disk operating system. However, the present invention can be controlled with hardware, firmware or any combination of firmware and software, without departing from the teachings of the present invention.

By way of example and not limitation four general categories of implementation are described for the present invention.

A. Y-adder shift table and threshold difference engine incorporated within a computer aided design application for generating static hardware multiplier designs having discrete or programmable adders and shifters.

B. Y-adder shift table and threshold different engine integrated within an application circuit for generating multiplier values dynamically. The adders and shifters comprise elements connected under program control, or fixed combinations that can be used.

C. Y-adder shift table, threshold difference engine, and the shifters and adders are all implemented in firmware/software for execution by a microprocessor, or to other processors coupled to the microprocessor.

D. Y-adder hardware slide shift engine is implemented in hardware for executing multiplication. Multiplier values are established by a controller which outputs control bits in response to the desired multiplier to set the state of shifters and adders to accomplish active or pass-through operation, or other similar operations within the engine, wherein the shifts and adds do not need to be interconnected into a particular pattern for each different multiplier.

One of ordinary skill in the art will appreciate that numerous combination of the above categories can be implemented without departing from the teachings of the present invention.

FIG. 1 illustrates by way of example embodiment 10 a Y-adder power of two shift and add table according to the invention upon which the multiplication engine operates. A first arrow block 12 is shown providing an initial multiplication by $2^{-1}$, whose output fans out into columns and rows of additional shifter blocks. Each of the shifter blocks represents a single right shift operation of any desired number of bits in width. A first column of shifters 14 is shown to represent a sequence of shifts (multiplication by $2^{-1}$).

It will be noted that the inputs to the shifters in this column is directed vertically downward wherein a combined series of shifts can be provided before the adder. A second column of blocks 16 illustrate add blocks for combining the output of shift block 12 and the combination of shifts from shift block 12 which has been additionally shifted by shift blocks in column 14 down to the respective row of the adder. These two left columns containing shift and add operations determine the spacing between the first shift right and the next variable shift right. The longer the spacing that results between shifts, the more accurate the resultant multiplication (as can be seen in the numbers above the shift right blocks). It should be noted that the Y-adder power of two shift table can be created with any desired number of columns and rows which provide an accuracy fitted to the needs of the application.

In one embodiment of the invention the Y-adder power of two shift table is represented in firmware or software for use by the threshold decision engine as a linear array of records. Each record comprising a shift-add path description from the input of the table leading up to a given output node found in the table, and a coefficient value which represents the proportional contribution from the input as found at that node. Typically, the coefficients are based on an input value of one, although technically any value can be utilized.

In the example shown, the shifts before the adder are fixed to one and need not be included in the description (if known by the engine) wherein the path description can be formatted as "shifts before the adder", and "shifts after the adder". For example in table one the path for the coefficient 0.3125 can be described as 3, 1 because the first input (angled input to the top adder in column 16) has a fixed right shift of one (for this example but not limitation) and the second input to the adder goes through the shift of block 12 and the first two shifts in the vertical shift column before aggregation in the adder. It will be understood by one of ordinary skill in the art that descriptions following a number of different formats can be considered. The use of a linear array (or list of records) allows the ordering of all coefficient values, such as by decreasing value, wherein a search for close fitting coefficients can be accomplished in a single linear search through the array.

It should be recognized that the best accuracy may not always be achieved by finding the first coefficient, or subsequent coefficient, which is closest to the error at that point, but in some cases can arise from a combination of nearby values which results in a closer match.

The following example is for the sake of comprehension only and does not bear on the actual values used. Presume a table with coefficients 10, 8, 6, 5.5, 4, 3, 1.5, 0.75, 0.4; and a multiplier value of 7. A successive best fit approach which finds the best fit each time would cause the selection of 6 and 0.75 with an error of 0.25. However, more sophisticated approaches can result in selecting 4 and 3 for an error of 0. The best fit approach provides a solution which sufficient accuracy, but may not always be optimal for a given number of coefficients. However, it should be appreciated that the practice of the invention is not limited by following the successive best fit approach. Based on the above teachings one of ordinary skill in the art will appreciate that heuristic approaches, trial and error, or other techniques can be utilized for reaching optimum accuracy as desired. In one embodiment the successive best fit approach can be initially used but overridden if a better solution is arrived at.

It should also be appreciated that the underlying table and respective coefficients used in the inventive method can be generated by any convenient means. In one embodiment of the invention a computer aided design application integrates the teachings of the present invention to use either fixed tables, or generated tables, from which one or more sets of coefficients are associated for iteratively determining a set of shift-add paths which correspond to the desired multiplier. The resultant multiplication engine may be implemented by combining the shifts and adds in fixed hardware (static multiplication), programmable hardware (static or dynamic multiplication), or in firmware/software, or combinations thereof.

In the case of dynamic multiplications, table information is retained by programming within the application so that sets of coefficients can be determined on the fly and from which shift-add paths are determined based on the table and combined for any desired multiplier value.

In creating the Y-adder power of two shift table it should be recognized that the column of adders could be moved more to the right past one or more shifter column positions. Alternatively, or additionally, more than one column of adders can be coupled into the system. Consequently, it should be appreciated that the generation of shift-add combinations can be tailored to fit certain applications, for instance if an application often relies on multiplication by 0.3, then the adders can be placed in the $2^{nd}$ column. For the given diagram, the adders after the first column make a multiplication with combinations of 101 patterns. With the adders after the $2^{nd}$ column, multiplications will be done with 1001 patterns, likewise with adders after the $5^{th}$ column make multiplication with 1000001 patterns. Likewise a series of adders can be placed in the Y-adder power of two shift table to create multiplication with three combinations of '1's, such as in 100101. However, the search size for desired coefficients increases with the number of ones and there may arise little need within typical applications. With normalized data (data between $-1$ and 1), these '1' spacings immediately show how many bits are needed to keep the multiplication accurate.

One of the aspects of the design is the use of a threshold decision engine operating in combination with the described Y-adder power of two table in order to determine a set of coefficients and respective shift-add paths according to the Y-adder power of two shift table for performing the multiplication by the desired multiplier number. One of the benefits of the multiplication engine based on this table and threshold decision engine is that it can be implemented readily with limited electronic hardware (i.e., small amounts of silicon real estate), while providing the capability to render accurate multiplications. It should also be appreciated that the iterative technique of locating coefficients within the set of coefficients as described herein can be implemented in firmware wherein it provides any desired level of accuracy with low execution overhead and delay. The shift-add paths to the coefficients within the shift table are then used for the multiply operation. In the case of hardware, the shift-add combinations are combined into a shift-add circuit which requires only a small amount of hardware. In the case of firmware the shift-add combinations can be processed separately as operations whose results are then summed yielding a low overhead fast multiplication.

It should be appreciated that the table-based multiplication engine described herein generates shift-add paths with decreasing levels of contribution, therein allowing systems in select applications to utilize a rough resultant output, such as from a first set of coefficients, to commence operations, and to then converge their operation based on more accurate information as additional coefficients are located by the threshold decision engine. This can allow a system to more readily reach a result, or allow for the use of lower cost (slower) processors or circuitry for executing the multiplication engine. A number of applications can benefit from this ability to initially get a rough answer then to provide increasing accuracy as more stability is required. By way of example and not of limitation, the implementation of equalizers is one such application in which first receiving rough multiplication outputs, prior to receiving more accurate multiplication outputs, can be of significant benefit.

One aspect of the Y-adder power of two shift table is that the input is shifted, divided by 0.5 according to this one embodiment, which is then added to the contributions from the first shift column within the first adder column. It should be appreciated that any shifter value can be utilized at the input of the table without departing from the teachings of the present invention. It will be appreciated that in many cases a single shift right can be implemented in hardware as a simple wiring difference which does not require silicon area.

The structure of the Y-adder power of two shift table controls how the numbers are changed in the multiplication, without the need of dedicated multiplier hardware, and while providing as much accuracy as desired for the given application. The table can be created based on any input number, wherein the user fixes a starting number (i.e., 0.3) and bases all shift/adds on that number, wherein the number does not need to be 0.5. This Y-adder power of two shift table is key to generating accurate shift-add paths associated with contributory coefficients located in the table by the threshold decision engine.

The following is an example of determining the set of table coefficients associated with a set of shift-add paths for performing a multiplication by ⅓:

⅓~0.3125+0.0234375−0.0029296875+0.000244140625

⅓~0.333251953125

It should be appreciated when using the Y-adder power of two shift table, that sign polarity is handled within the threshold decision engine, for example in determining if the latest result has exceeded the desired coefficient or not. When looking through the table, the engine always looks to find the lowest absolute error. So in one embodiment of the invention it can configure either an addition or subtraction to yield a combination to get the lowest error either a little higher or little lower than the lookup value. It will be appreciated that adders may be configured to perform either add or subtract, or may be limited to only additions, or subtractions according to different embodiments of the present invention. There is generally no requirement that the multiplication result always be positively offset or negatively offset, in so far as it is found sufficiently close to yield correct operation. It will often arise that the startup value and lookup value will have different signs as the threshold decision engine is looking to lower the error from the start value with the lowest number of iterations.

Figure 2:
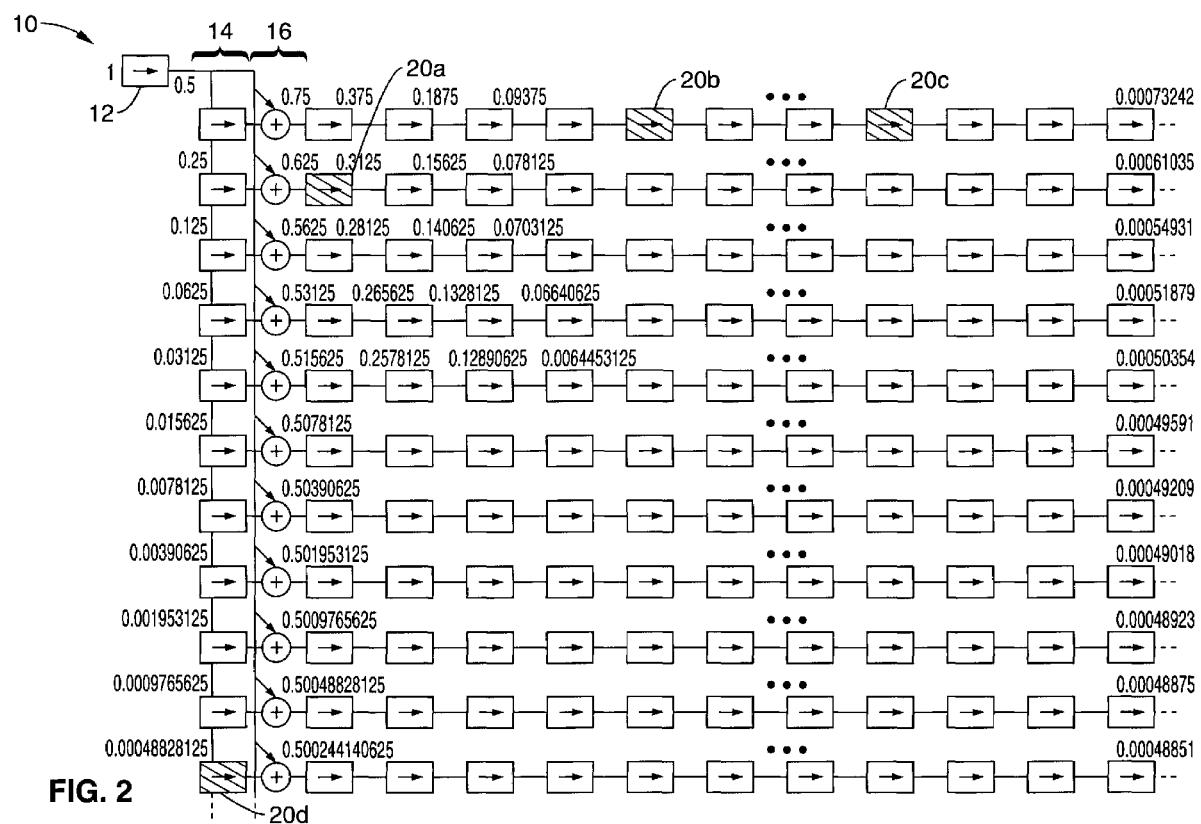
FIG. 2 is the table of FIG. 1 showing coefficients located on the shift-add table for performing a multiplication by ⅓ by way of example, according to an aspect of the present invention.

FIG. 2 illustrates the multiplication by ⅓ example in which the selected power of two numbers in table 10 are shown by the darkened blocks 20a-20d indicating the position of the shift value. The result of passing the data through these shift and add paths multiplies the data by the coefficient. A right shift of one bit divides the number by two, this combined with the adds of another shift combination will create a coefficient multiplication.

It should be appreciated that within the present invention, there has been no emphasis placed on lowering the number of ones within the result or intermediates as described with regard to conventional multiplication techniques. The present invention as embodied is concerned only with the number of specific combinations of ones (or combination of a start number and it's shift or add combinations), and how to reach the desired multiplication value more readily than attained by conventional multiplication practices. Reducing the number of ones generally can provide for limiting the number of iterations the threshold decision engine performs, since in this embodiment it is only looking at a certain combination of two ones (or three ones if there are two columns of adders in the table). It should however, be appreciated that the present invention can be utilized in combination with mechanisms to limit the number of ones without departing from the teachings of the present invention.

Figure 3:
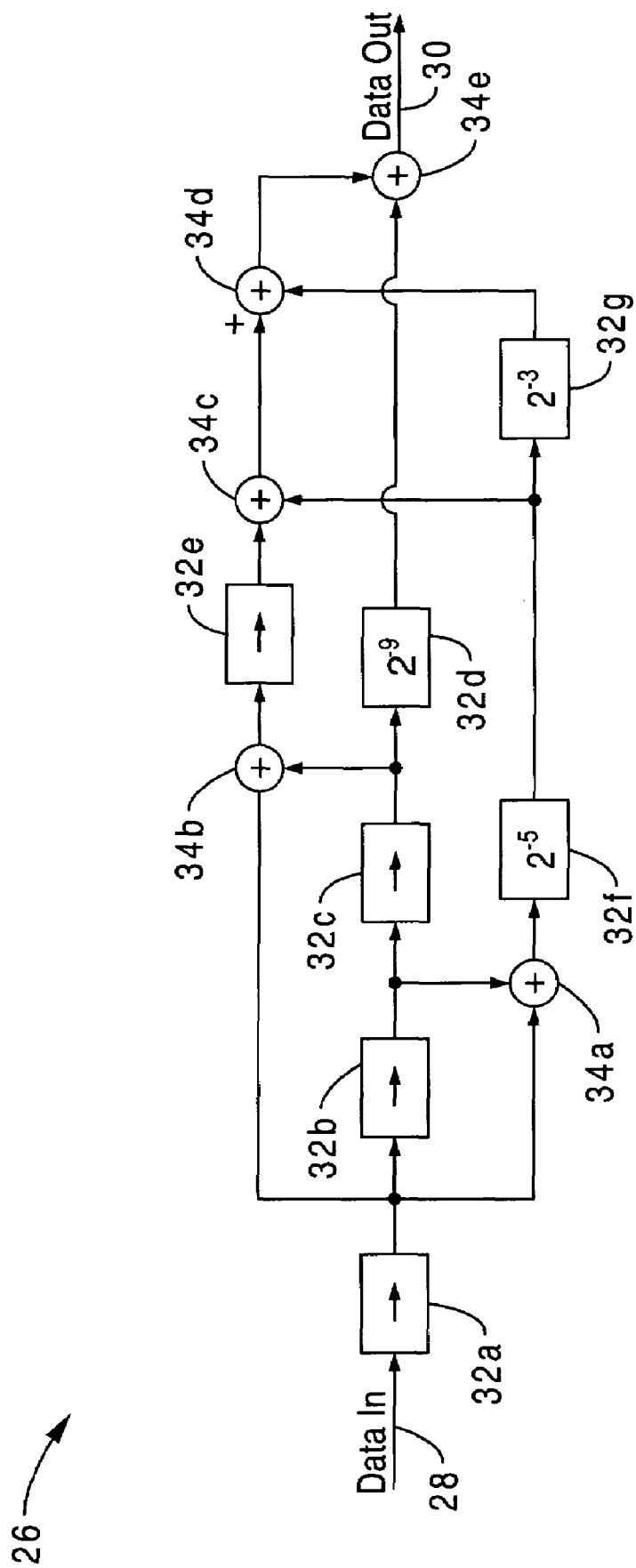
FIG. 3 is a schematic of a multiplication engine for performing the multiplication by ⅓ whose coefficients were found in FIG. 2, showing the interconnected combination of shifts and adds according to an aspect of the present invention.

FIG. 3 illustrates an embodiment 26 of the combined shift and add paths from the table associated with the located coefficients for the example multiplier value of ⅓. Data input 28 connects to shifters 32b-32g and to adders 34a-34e to generate data output 30. It can be seen that this technique allows for the rapid development of hardware which performs multiplications, or in which multiplications are integrated. It should be noted that multiple sequential shifts are shown with a binary power notation, such as block 32d which is $2^{-9}$ representing 9 right shifts, block 32f which is $2^{-5}$ representing 5 right shift, and block 32g which is $2^{-3}$ representing three right shift.

The combination of shift and add paths for the example multiplication by ⅓ will result in multiplying the data by 0.333251953125. As part of the testing of the present technique we confirmed the operation of this static coefficient example within an FPGA design. Several filters were also made using this engine having various number of taps, specifically ranging from 17 to 31 taps, and providing a range of accuracy, specifically from 14 to 16 bits of accuracy. The results confirmed that the inventive technique offers high levels of performance while requiring a relatively low gate count.

The following describes by way of example an embodiment which illustrates the process.

Acceptable levels of accuracy for most applications are typically achieved when the coefficient gets close to the fourth digit. However, a tradeoff is often necessitated between depth of the table search and the accuracy desired for the application. In many applications a depth of four leaves a minor inaccuracy, yet the multiplier value is still sufficiently accurate to keep most systems stable. If the numbers are normalized it is tantamount to having less accuracy, but the data still gets multiplied by a multiplier value which is close to the desired value. In the present embodiment, the fourth coefficient provides an easy target reference which results in approximately 12 to 13 bit accuracy. When numbers are larger than that, the accuracy drops but a sufficient accuracy should still result. Therefore, it should be appreciated that the threshold depends on the accuracy, speed requirements, and storage requirements of the intended application. The multiplication engine described herein can support any desired digit depth.

By way of example, and not limitation, consider the case of multiplication by ⅓ or 0.333333333. In one example solution the multiplication provides a desired solution from four table coefficients with the number 0.33325XXXX where the first 3 digits are exactly replicated. This results when the shift-add combination is chosen that will make the fourth digit close to the expected coefficient. The accuracy provided is determined by the needs of the application, because the present technique can provide any desired level of accuracy in response to tradeoffs being made with table space and the number of iterations going through the table. By way of example, 256QAM (a form of Quadrature Amplitude Modulation which is a modulation technique that generates four bits out of one baud) requires a bare minimum of 8 bits to operate, with 10 bits being a more typical lower bound on the number of bits used. The closeness can be set based on bit number, such as 11 bits, within the threshold decision engine programming.

Figure 4:
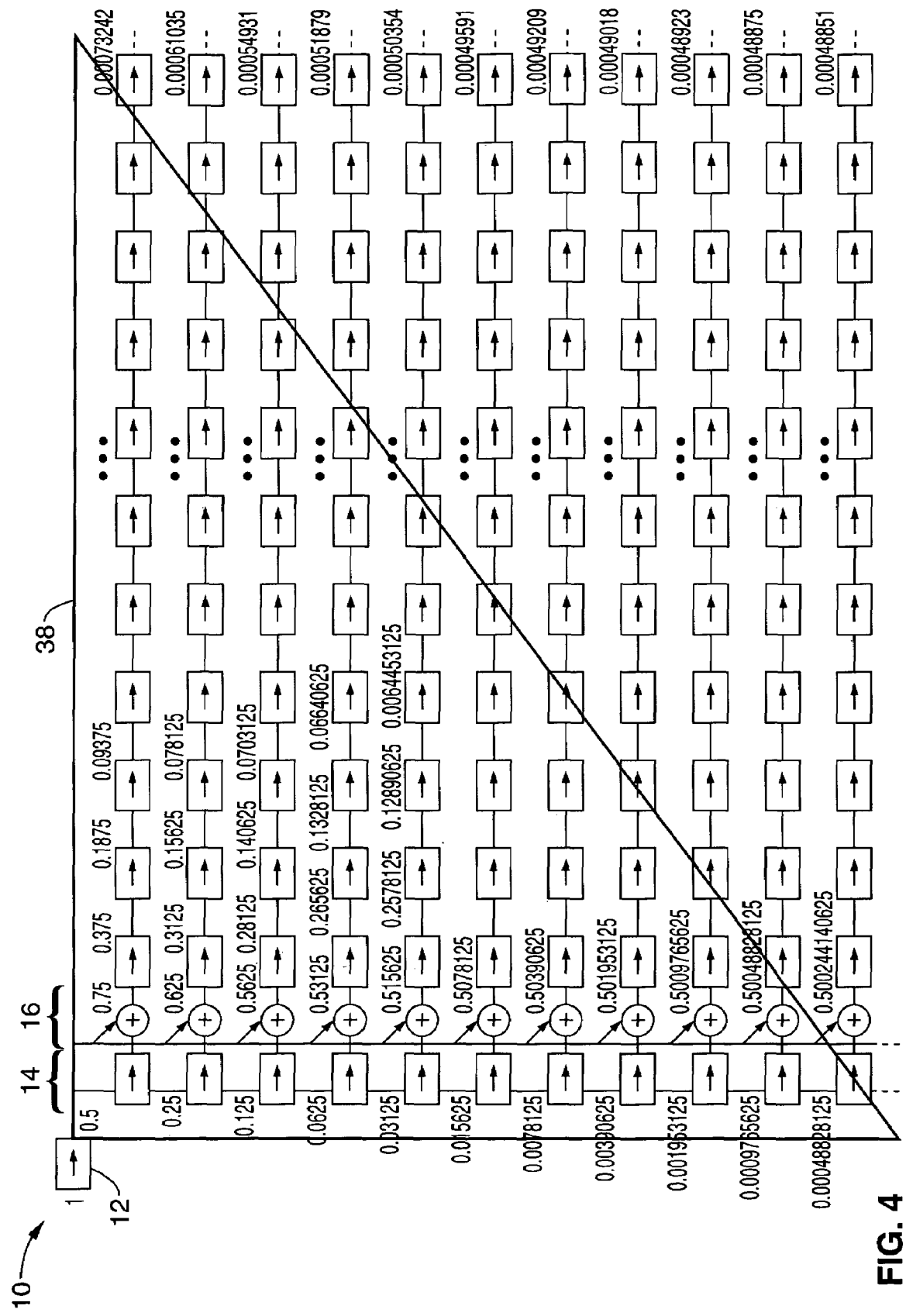
FIG. 4 is a table containing the Y-adder power of two shift table of FIG. 1, showing best result areas within the table according to an aspect of the present invention.

FIG. 4 illustrates Y-adder power of two shift table 10, having an upper left hand triangular portion 38, upon or within which, coefficients are preferably located by the threshold detection engine.

The performance level of the technique is determined by the number of shifts needed. The present technique can be considered high performance in view of the low number of right shifts that are needed, wherein the design can be implemented with low bit counts and smaller implementations.

Any decision engine, like a recursive error estimator, starting with the closest number will work well with coefficients in triangle 38. However, it should be appreciated that triangular area 38 is only a guideline. If it is easier to implement a coefficient with many shifts then this also can be implemented without major penalty (i.e., the extra bits must be carried to keep the least significant bit).

Figure 5:
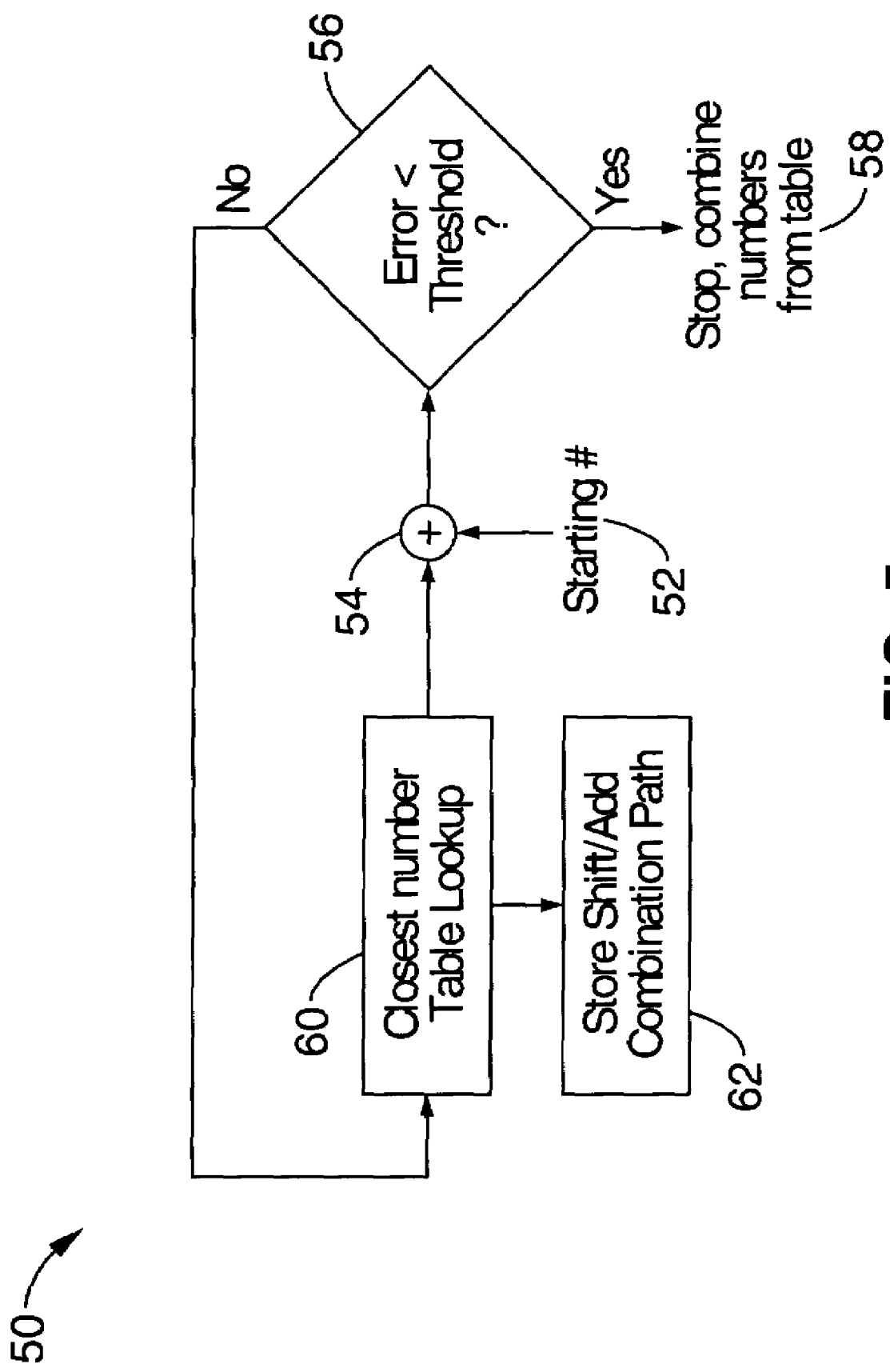
FIG. 5 is a flow diagram of a threshold decision engine for determining a set of threshold coefficients and respective shift-add paths from the Y-adder power of two shift table according to an embodiment of the present invention.

FIG. 5 illustrates an example embodiment 50 of a threshold decision engine. The flow diagram illustrates a starting entry 52, adder 54, threshold comparison 56 with exit 58, and a lookup operation 60 for finding the closest coefficient value in the Y-adder power of two shift table lookup and for storing the shift/add combination path. In operation, a multiplier value is entered at block 52 and summed 54 with the output of the closest number lookup 60 whose value has been stored 62. The error is checked at block 56 and if below the threshold the process stops as per block 58 and the numbers from the shift table are combined. Otherwise, the closest lookup 60 finds the closest error value 60 storing that value as per block 62 and performing another summation of block 54 and so forth.

In operation, threshold decision engine looks at the recent result of the combination and the starting number. It is configured to find the closest result by moving in the direction of smaller and smaller errors. When the error gets below a threshold, (or the desired number of bits of accuracy reached) the shift-add path is declared and used for the multiplication. In this mode of the invention the error threshold is a fixed absolute value parameter for the threshold decision engine, however it will be appreciated that it can be adapted as a variable and modulated in response to any requirements within the given application. The threshold decision engine continues to check latest result of the path in relation with the target and determines if another path needs to be found or if the result is of sufficient accuracy to meet the requirements. It should be appreciated that the technique can be implemented to check the accuracy of the path based on either the accumulated value of the shift/add combinations or the difference from these combinations to the target.

It should be noted that as the result gets closer to the desired coefficient, the decision engine fans out to the smaller numbers that will make the coefficient more accurate. During this process the threshold decision engine iteratively obtains coefficient values from the shift table that have further and further shift right values, wherein the further distance in the shift table between shift rights is indicative of yielding more accurate numbers. The Y-adder power of two shift table has knowledge of all available shift-add paths and the corresponding coefficient to that node in the table (i.e., nodes defined as outputs from shifters and adders, or alternatively nodes defined as inputs to shifter and adders). The paths and coefficient values can be retained, for instance within a ROM or other memory structure configured for retaining them.

In one aspect of the invention, a table or list of the path-coefficient combinations, can be created from the table. For example the coefficients can be listed in a field in numerical order (i.e., largest coefficient to smallest coefficient), thus making a binary search possible to quickly find coefficients to successively minimize the error. It will be appreciated that other arrangements can be configured by one of ordinary skill in the art based on the Y-adder power of two shift table without departing from the teachings of the present invention. To determine coefficients that provide adequate accuracy, the decision engine stops when the error becomes less than a specified number of digits, or error. A setting of four digits was chosen for demonstration purposes, although it should be appreciated that the threshold is completely programmable and provides a tradeoff between number of bits to carry versus required performance.

The threshold decision engine fan out constrains the table lookup which is very useful in equalizers where coefficients will not change dramatically. The present invention is particularly well suited for use with equalizers, wherein fast, accurate, dynamic multiplication is needed.

Cycle actions according to the decision engine are shown below following the decision engine of FIG. 5.
1. 0.3333333333333−0.3125=0.020833333333333
2. 0.0208333333333−0.0234375=−0.002604166666
3. −0.002604166666−(−0.0029296875)=0.0003255208333
4. 0.0003255208333−0.000244140625=0.000081380208
5. Stop due to 4th digit error being zero (arbitrary threshold)

This simple decision engine can be implemented in firmware or hardware, depending on the type of application to which it is to be applied. It should be appreciated that the technique can be performed within a circuit design application (i.e., FPGA design) in which a combination of static shift-add paths are determined, such as for being programmed into hardware or firmware. It should also be appreciated that additional benefits are derived using the technique in relation to conventional techniques, when the decision engine and table lookup are performed within electronic hardware therein providing quick execution and low overhead.

FIG. 6A-6D illustrate four shift-add path combinations, following the example ⅓ multiplier, which correspond to the located coefficients whose sum estimates the multiplier value. After, or as, the engine finds the coefficients based on the Y-adder power of two shift table, the shift-add path to each coefficient is created/combined into the multiplication engine. If the multiplication engine is hardware, then the shifters and adders are configured for the multiplication. This hardware can be statically controlled although this example is more particularly directed at dynamic control. In the case of firmware the shift-add paths are configured as execution steps which can be executed with low overhead. The shift-add path for arrival at each of the four coefficients is shown charted in the figures.

In the example of FIG. 6A the hardware 64 is shown for arriving at combination 1 of shift-add paths corresponding to the first coefficient of 0.3125. It will be seen that a single shift 72a occurs which feeds a double shifter 72b and adder 74a, output of double shifter 72b also coupled to adder 74a. The output of adder 74a then is coupled through shifter 72c prior to output as combination 1.

FIG. 6B depicts example hardware 66 for arriving at combination 2 of shift-add paths corresponding to the second coefficient 0.0234375. A single shifter 72d is coupled to both single shifter 72e and adder 74b, with output of single shifter 72e coupled to adder 74b. The output of adder 74b coupled to a five stage shifter 72 prior to output as combination 2.

In FIG. 6C the hardware 68 is shown for arriving at combination 3 of shift-add paths corresponding to the third coefficient of −0.0029296875. A single shifter 72g is shown coupled to both a single shifter 72h and adder 74c, the single shifter is also coupled to adder 74c. Output of adder 74c is coupled through an eight stage shifter 72i and a negation 72j prior to output as combination 3.

Then in FIG. 6D hardware 70 is depicted for arriving at combination 4 corresponding to the fourth coefficient of 0.000244140625. Combination 4 only requires a twelve stage shifter. Further hardware simplification can be realized by combining the above shift-add path combinations to produce a single result.

Figure 7A:
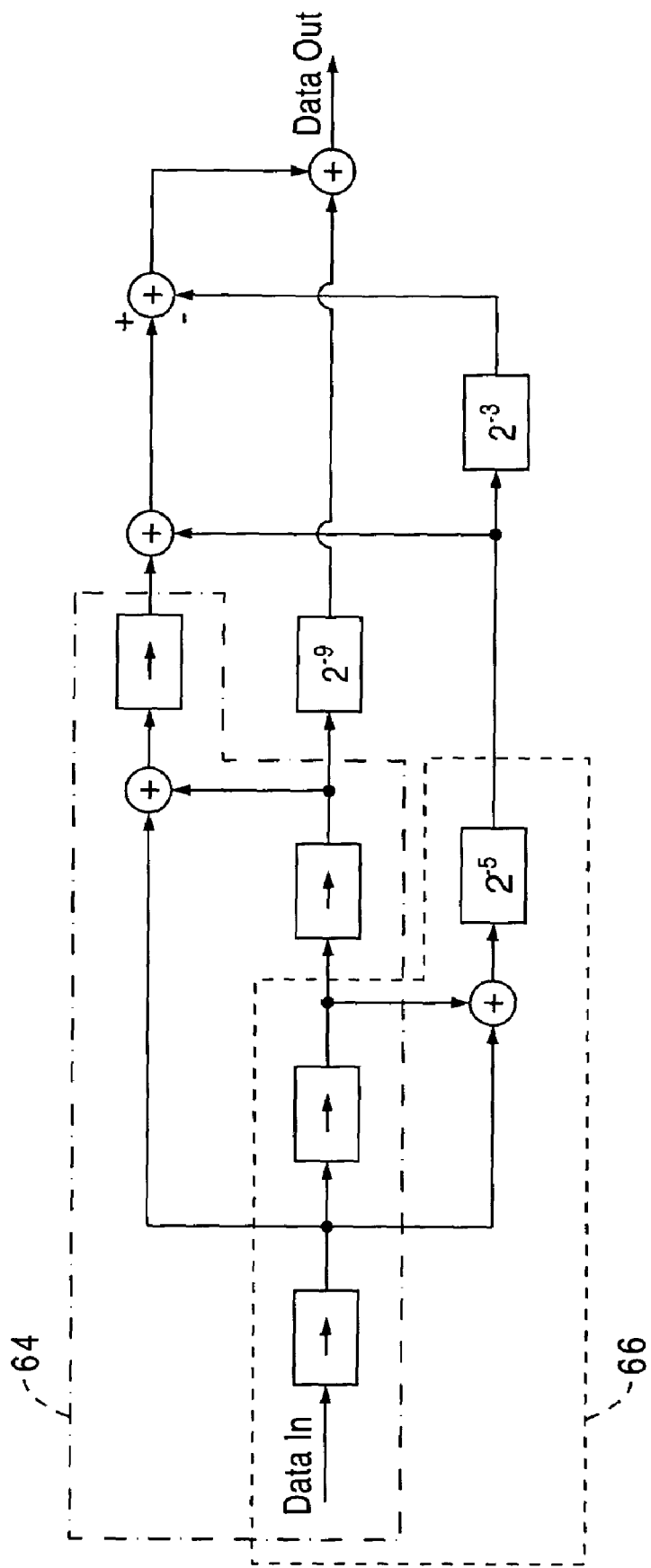
FIG. 7A-7B are schematics of the multiplication engine of FIG. 3, showing the combination of the additions and shifts from FIG. 6A-6D marked on separate sheets of FIGS. 7A and 7B for clarity.
Figure 7B:
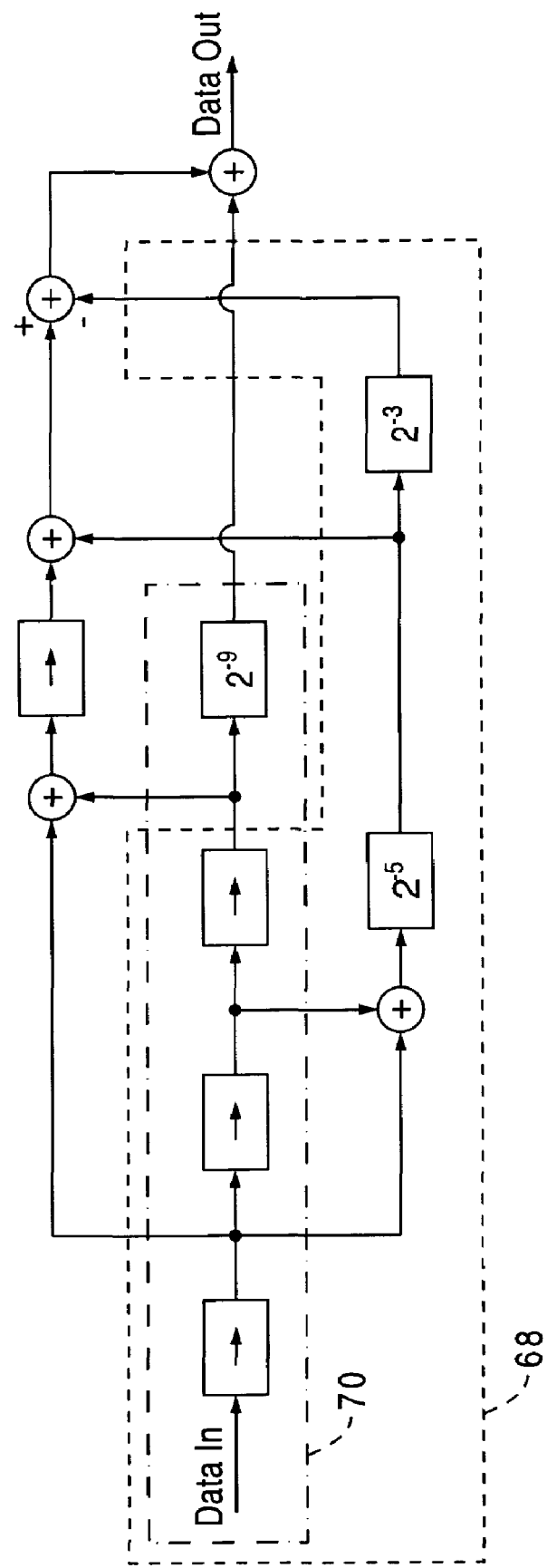

FIG. 7A-7B illustrates an embodiment by way of this example for implementing the coefficients in hardware. It will be noted that FIG. 7A and FIG. 7B each depict identical blocks as that found in FIG. 3. FIG. 7A depicts the blocks 64 associated with forming combination 1 and the blocks 66 associated with combination 2, surrounded by different forms of dotted lines. It should be noted that a number of the shifts and adds are in common thus reducing circuit complexity. Similarly, FIG. 7B depicts blocks 68 associated with forming combination 3 and the blocks 70 associated with forming combination 4, which are also surrounded by different forms of dotted lines to aid in distinguishing them. As the showing of four sets of dashed lines in one figure might lead to confusion, the combinations were shown only in pairs on respective FIG. 7A and FIG. 7B. Since the maximum shift right value is twelve, at least 12 bits are used to carry in the coefficients for correct operation. This process repeats dynamically for changing coefficients, and for each tap, such as for use in a filter, equalizer, or other applications.

In combining the different shift-add combinations, such as combinations 1-4, into a single circuit or set of program steps, the elements are combined when possible to simplify the number of steps, or multi-step shifts separated to prevent duplication of common shift elements. For example, double shift 72$b$ of FIG. 6A is converted to two single shifts as seen by shift blocks 32$b$, 32$c$ in FIG. 3. It should also be noted that all four combinations include the first two shifts 32$a$, 32$b$ (FIG. 3). The $2^{-8}$ shift of combination 3 is separated into a $2^{-5}$ shift 32$f$ in combination with a $2^{-3}$ shift 32$g$. As can be readily recognized from the combining these paths the resultant operation are minimized.

Figure 8:
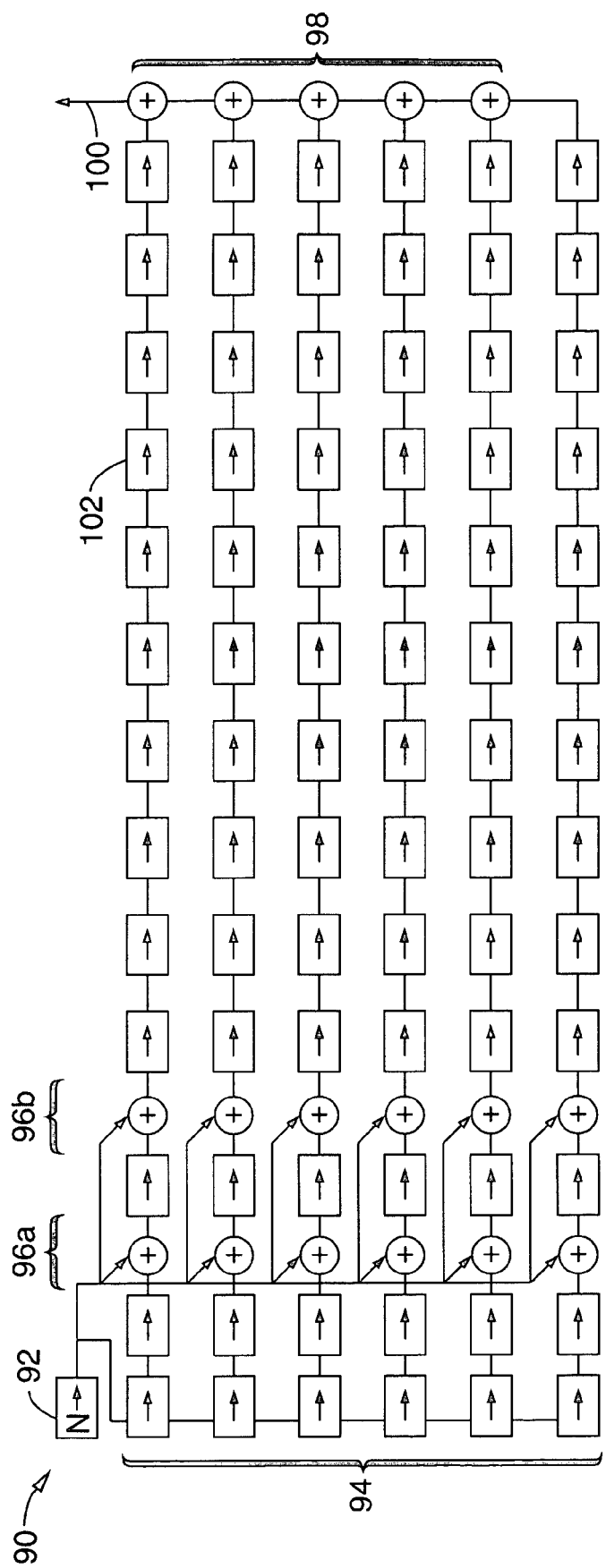
FIG. 8 is a schematic of a Y-adder hardware slide shift multiplication engine according to an embodiment of the invention, showing slide shift-add hardware for implementing an efficient multiplication engine without the need to reconnect shifter and adders into new combinations as new multipliers are received.

FIG. 8 illustrates an embodiment 90 of a multiplier engine that is implemented completely in hardware and operates without need of reconfiguring connections between the shifters and adders to perform the multiplication. This embodiment is referred to as a "Y-adder slide shifter multiplication engine" and it can execute multiplications with any multiplier value (within the range of the associated table construct) rapidly as the multiplication is performed in hardware and can be readily setup for separate multiplier values. It should be appreciated that aspects described in the following embodiment can be applied separately or in any desired combination with aspects previously described without departing from the teachings of the present invention.

The hardware table implementation utilizes selectable operation blocks to form the table, so that the connections between shifters need not be changed. In the following embodiment each shifter and adder can be set by the controller to execute either its intended operation shift or add respectively, or a no operation state (i.e., letting the input "slide" to the output) in which the input is just passed to the output. In view of this "slide" mode this form of hardware table was morphed into what is referred to herein generally as a "Y-adder slide shifter multiplication engine".

In the slide shifter multiplication engine a coefficient can be associated with each node representing the contribution to a final sum as found at that node. The selectable nature of the slide shifters and adders are controlled, during a multiplier value setup process, which establishes a set of states for the slide shifter and slide adder blocks in response to the combination of coefficients located.

Other variable aspects of the blocks can be additionally, or alternatively adapted, for example each adder can be configured to provide additional variations, such as modes for (i) adding both inputs, (ii) subtracting first input from second input, (iii) subtracting second input from first input, and (iv) adding both inputs and inverting output sign. In another variation, the adder and shift function can be incorporated within a single block wherein the function used is selectable.

In the embodiment of FIG. 8 the slide shifters and slide adders include a pass-through state, with the selection of active/pass-through states being selected by the controller (1 bit per block). The input shift block 12 from the previous table has been modified into a selectable "n" shift element 92 which can execute a desired number of shifts to normalize the input to a desired range for input to the table. The "n" stage shifter can be implemented to accept an input variable or configured by connecting a number of pass-through (slide) shifters in series whose slide state is set by the controller. It should be appreciated that the row of slide shifters 102 can also be implemented as a selectable n-shifter.

A first column of shifters 94 is extended, depicted with different numbers of shifters (either one or two in this example) preceding the adders in the first column of adders 96. It will be appreciated that this can be extended to any desired number. For example another variation can be created with additional shift blocks placed before the adder, (i.e., 2, 3, 4, 5 shifts in four successive rows for a four coefficient match), wherein the number of rows can be cut down to a number matching, or close to, the number of coefficients to be found. In this way the values found lower in the table are formed through more shifting before the add. The pass-through mode of these pre-add shifters allows them to function as if in a higher row or much lower row depending on the coefficient values found.

In view of the slide nature of this first column of shifters the number of rows contained in the table has been truncated in comparison with the number of rows depicted in the example table of FIG. 1. In prior examples the fixed table of 11 rows was used to locate 4 coefficients. In the example, two of these coefficients were found on the same row. However, to reduce the amount of hardware needed each row is somewhat variable therein allowing rows to provide any reasonable number of shifts and to allow duplicating shifts between rows. For instance, consider the case as shown in FIG. 2 wherein two of the coefficients from different "iterations" are found on the same row. To match this case the hardware slide table version is configured with the first shift in that second row being set for straight through (no shift), thus doubling up the previous row with the same pre-adder shift, so that coefficients are generated simultaneously from two rows having the same number of pre-adder shifts.

Two columns of slide adders 96$a$, 96$b$ are exemplified therein providing additional variability of the coefficients, it will be appreciated that for typical applications only one adder in each row would be in set in adding mode, although advantage can be made of multiple adds in select applications.

A row of adders 98 is shown terminating each row, except the bottom row as shown. These adders sum the contributions provided from the current row and underlying row of the table into a product 100. These adders are preferably implemented as slide adders wherein only desired rows can contribute to the product solution. In addition, these adders are particularly well suited for being controlled as to polarity of the inputs, in particular whether the current row is added or subtracted from the partial result chained up from beneath, although optimum operation of the threshold decision engine becomes somewhat more complex than described.

A control circuit sets the states of the shifts and adds (for active or pass through) wherein the full multiplication is then performed without having to construct a separate combination by interconnecting shifts and add as seen in FIG. 3. Control of each row only requires specifying at what point along the row that a transition is made from active states to slide states. Therefore, up to 16 slide shifters in the row after the first column of adders could be controlled with 4 bits from the controller. In response to receiving the multiplier value (i.e., 0.33333 as per example) the control circuit would look up in a short table the multiplier, preferably as an index value, and load a control string which contains the states for the blocks. It will be appreciated that if wide variation in multiplier values will be received that the controller string can select multiple table entries and combine their respective control strings to effect a sum or difference, such as based on a row by row implementation.

By way of example of one embodiment with a maximum of 8 rows, and up to 16 slide shifters after the first adder column, the control table may be configured having 2 columns with N rows (=#rows×#cols) in a coefficient table. The first column, an index, contains a coefficient which can be generated by a particular configuration of a row. The second column contains information about establishing that configuration in a row. For example four bits control how many shifters are active in the row to the right past the first column of adders. Another set of bits provide control for the state of the shifters leading to the first adder (i.e., an absolute number as to how many are needed), and the active states of any adder columns in the row. The coefficients are arranged in the table in order of increasing or decreasing size. The process of locating coefficients is then performed quickly by successively finding least cumulative difference compared with the desired multiplier, or by cumulative sum, or other approaches that culminate in locating a set of coefficients whose sum approximates the desired multiplier value. The controls bits which have been found in the table are then used to set the active/pass-through state of the blocks for the multiplication.

It will be appreciated that any row for which coefficients are found would typically have the corresponding adder at the row end in an active state. Additionally, bits can be encoded to allow the adder at the row ends to selectively do subtractions on the row to increase the accuracy without adding more hardware. A sufficient number of slide shifters can be inserted prior to the first adder column in the hardware slide multiplication engine to accommodate the number of shifts required, however, the embodiment shown still presumes an ordering of the shift rows wherein succeeding rows build on the shifts of earlier rows to reduce the necessary hardware.

If sufficient rows are available the Y-adder slide shifter multiplication engine can be configured to more readily shift between successive multipliers, or between alternate multipliers or any of a set of multipliers, by configuring rows for these coefficients and using the shift adders at the end of the row for selecting which coefficients are active and thus what the multiplier value is. A number of variations of this can be provided with smooth transitions between multipliers by changing control bits of the slide shifter-adder blocks as the coefficients are found for the current or next multiplication, and so forth. For most applications, the time required to reset the table and configure it for a new multiplier is sufficiently short so that elaborate shifting between multiplier values would not be necessary.

To reduce the number of control lines needed for controlling the slide shifter and slide adder blocks the controller can utilize a number of mechanisms, such as multiplexing the control data, using serial control signals, using memory based addressing schemes, or the like. It will be appreciated that the hardware need not be set to a given configuration from a single set of parallel bits (although that is rapid) but can be programmed in response to serial control signals, or matrix forms of addressing, and so forth in which the state of slide shifters and slide adders is set incrementally.

It should be appreciated that the Y-adder slide shifter multiplication engine has wide applicability as an alternative to existing hardware multipliers. The device can be implemented as a separate circuit, a logic block for inclusion in ASICs, and other applications which require high speed multiplications with low overhead.

The present invention provides methods and systems for performing multiplications based on a Y-adder power of two table which can be used in a number of alternative forms without departing from the teachings of the present invention. Embodiments are described which are suitable on a wide range of static and dynamic multiplication applications. The invention can be implemented on a wide range of hardware, firmware, software, or combinations thereof. It can be implemented to provide any desired range of speed depending on configuration and availability of hardware.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of executing a multiplication within an electronic circuit, the electronic circuit configured for performing the steps comprising:

(a) creating a Y-adder power of two shift table having a multiplicand input of a desired bit width coupled to at least one shifter column and at least one column of adders, with rows of right shifters extending from the adder columns, wherein coefficients are equated to the output contribution of each said shifter or adder in proportion to the multiplicand input;

(b) receiving a multiplier value of a desired bit width to which said multiplicand input values are to be multiplied by the electronic circuit;

(c) locating a coefficient associated with a shift-add path in said table to successively approach the received multiplier value;

(d) storing the shift and add path for said coefficient in a memory;

(e) repeating execution of steps (c) and (d) until a desired level of accuracy has been obtained in approaching the received multiplier value; and (f) combining the stored shift and add paths from memory to form a multiplication engine in which said multiplicand value is multiplied by said multiplier value to generate an output product.

2. A method as recited in claim 1, wherein the multiplication engine is configured by combining into hardware the stored shift and add paths.

3. A method as recited in claim 1, wherein the multiplication engine is configured by executing the stored shift and add paths in a microprocessor.

4. A method as recited in claim 1:
wherein said Y-adder power of two shift table is implemented in hardware as a Y-adder hardware slide shifter engine;
wherein said Y-adder power of two shift table further comprises:
a plurality of hardware slide shifters and hardware slide adders, forming at least a portion of the interconnected elements within the Y-adder shift table, that can be set into either an active state in which the shift or add is performed, or a passive state in which the input is passed to the output;
a column of slide adders coupled to the end of the slide shifter rows for summing the contributions from each row of slide shifters and the sum from preceding rows into a resultant product sum;
a controller for outputting state control signals to set the state of the slide shifters and slide adders in response to the combination of the located coefficients; and
wherein the multiplication engine is configured for performing a single pass multiplications with different multipliers without reconnecting shift and add paths.

5. A method as recited in claim 1, further comprising outputting shift-add paths as they are located to provide a rough output which converges to a more accurate product as additional shift-add paths are located.

6. A method as recited in claim 1, wherein said Y-adder power of two shift table comprises or represents an input coupled to at least one column of series interconnected shifters preceding at least one column of Y-adders for combining an input from the shifter row with a contribution from the input.

7. A method as recited in claim 1, wherein the process of locating and storing coefficients in steps (c) and (d) comprises a process of maintaining an error value as located coefficients are subtracted from the received multiplier value until the error is sufficiently close to the desired accuracy.

8. A method as recited in claim 1, wherein the process of locating and storing coefficients in steps (c) and (d) comprises a process of summing successively located coefficients until the sum is sufficiently close the received multiplier value.

9. A method as recited in claim 1, wherein said locating of coefficients is performed in response to the absolute values of the coefficients.

10. A method as recited in claim 1, wherein a constant contribution fraction from the input is added to the first shifted value within said Y-adder power of two shift table.

11. A method as recited in claim 1, wherein said electronic circuit comprises a circuit having a processor which executes instructions for performing the steps of the multiplication process.

12. A method as recited in claim 1:
wherein said electronic circuit comprises a hardware circuit being designed for performing static multiplication; and
wherein executing of said method comprises executing application programming which is configured for defining the multiplication in terms of shifts and adds which can be designed within, or programmed into, said hardware circuit.

13. A method as recited in claim 1:
wherein locating of coefficients is performed in response to a value table or value list which is created based on an ordering of coefficients of paths from said Y-adder power of two shift table;
wherein said value table or said value list contain a table or list of records, wherein each record contains a field with a coefficient and a field with a shift-add path to the coefficient; and
wherein said value table or said value list is configured with the coefficient fields organized in numerical order.

14. A method as recited in claim 1, wherein locating of successive coefficients is performed within a threshold engine executed in firmware or software.

15. A method of executing multiplications in an electronic shift-add circuit, the shift-add circuit configured for performing the steps comprising:
creating a Y-adder hardware slide shift engine having a multiplicand input of a desired bit width coupled to at least one shifter column and at least one column of adders, and rows of right shifters extending from the first adder column out to a terminating column of adders;
wherein said shifters and adders comprise hardware slide shifters and hardware slide adders that can be set into either an active state in which the shift or add is performed, or a passive state in which the input of a shifter, or one of the inputs of an adder, are passed to the output without shifting or adding;
wherein coefficients are equated to the output contribution of each said shifter or adder in proportion to the multiplicand input;
receiving a multiplier value of a desired bit width to which said multiplicand input values are to be multiplied by said Y-adder hardware slide shift engine;
locating successive coefficients of diminishing contribution to the received multiplier value to successively approach a desired accuracy; and
outputting state control signals to said Y-adder hardware slide shift engine in response to the combination of shift-add paths corresponding to said located coefficients;
wherein said multiplicand value is multiplied by said multiplier value within said Y-adder hardware slide shift engine and summed at the end of each shifter row to generate an output product in a single pass; and
wherein interconnections between shifter and adders need not be configured for different received multiplier values.

16. A multiplication engine configured for executing a sequence of multiplications between a multiplicand and multiplier within an electronic circuit, the electronic circuit configured for performing the steps comprising:
a Y-adder power of two shift table having a multiplicand input of a desired bit width coupled to at least one shifter column and at least one column of adders and rows of right shifters extending from the shifter and adder columns;
wherein coefficients of said Y-adder power of two table are equated to the output contribution of each said shifter or adder in proportion to the multiplicand input;
a threshold decision engine executing on a processor and configured for receiving a multiplier value of a desired bit width to which said multiplicand input values are to be multiplied by the electronic circuit;

programming configured for execution on the processor for,
- locating a coefficient associated with a shift-add path in said table to successively approach the received multiplier value,
- storing the shift and add path for said coefficient,
- repeating the locating and storing execution steps until a desired level of accuracy has been obtained in approaching the received multiplier value; and a control circuit configured for combining the stored shift and add paths to form a multiplication engine in which said multiplicand value is multiplied by said multiplier value to generate an output product.

17. A multiplication engine as recited in claim 16, wherein said control circuit comprises programming executing on said processor for generating shift-add multiplication engine circuits in static hardware or programmable hardware.

18. A multiplication engine as recited in claim 16, wherein said control circuit comprises:
- a plurality of slide shifters and slide adders incorporated within said Y-adder power of two shift table forming a Y-adder hardware slide shift engine;
- a plurality of slide adders coupled in a column terminating each slide shifter row; and
- a state generation circuit which outputs bits for selecting the active or pass-through state of said slide shifters and said slide adders in response to the combination of shift-add paths;
- wherein multiplicands received by said multiplication engine pass through said Y-adder hardware slide shift engine and are multiplied against the multiplier value without changing the interconnections between shifters and adders in response to configuring the multiplier for different multiplier values.

19. A multiplication engine as recited in claim 18:
- wherein said slide shifters and said slide adders are configured in a first state for performing their respective shift or add operation, and in a second state for passing-through the input value received to the output; and
- wherein said slide adders are configured in a pass-through state to ignore one input and to pass-through the value received on the other input.

20. A multiplication engine as recited in claim 18, further comprising additional slide shifter columns preceding the first slide adder column within said Y-adder hardware slide shift engine.

* * * * *